US009180765B2

United States Patent
Holmes et al.

(10) Patent No.: US 9,180,765 B2
(45) Date of Patent: Nov. 10, 2015

(54) HYBRID POWERTRAIN WITH CENTRIFUGALLY-ACTUATED MOTOR DISCONNECT CLUTCH AND METHOD OF CONTROL

(75) Inventors: Alan G. Holmes, Clarkston, MI (US); Min-Joong Kim, Bloomfield Hills, MI (US); Steven A. Tarnowsky, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 44 days.

(21) Appl. No.: 13/537,136

(22) Filed: Jun. 29, 2012

(65) Prior Publication Data

US 2014/0005864 A1    Jan. 2, 2014

(51) Int. Cl.
| | |
|---|---|
| *B60W 20/00* | (2006.01) |
| *B60K 6/442* | (2007.10) |
| *B60W 10/02* | (2006.01) |
| *B60W 10/08* | (2006.01) |
| *B60K 6/38* | (2007.10) |
| *B60K 6/52* | (2007.10) |
| *B60K 1/00* | (2006.01) |

(52) U.S. Cl.
CPC ... *B60K 6/38* (2013.01); *B60K 6/52* (2013.01); *B60K 2001/001* (2013.01); *B60Y 2400/416* (2013.01); *Y02T 10/6265* (2013.01)

(58) Field of Classification Search
CPC ................... B60K 2001/001; B60Y 240/416; Y02T 10/6265
USPC .................................. 701/22; 180/65.1; 477/3
See application file for complete search history.

(56) References Cited

U.S. PATENT DOCUMENTS

| | | | |
|---|---|---|---|
| 2005/0049100 | A1 | 3/2005 | Ai et al. |
| 2006/0148609 | A1 | 7/2006 | Roethler et al. |
| 2008/0272717 | A1 | 11/2008 | Gleason et al. |
| 2010/0258367 | A1 | 10/2010 | Venturi |

FOREIGN PATENT DOCUMENTS

| | | |
|---|---|---|
| CN | 1842425 A | 10/2006 |
| CN | 101299584 A | 11/2008 |
| JP | 2006327570 | 12/2006 |

*Primary Examiner* — Redhwan K Mawari
*Assistant Examiner* — Rodney P King
(74) *Attorney, Agent, or Firm* — Quinn Law Group, PLLC

(57) ABSTRACT

A hybrid vehicle includes an electric motor with a rotatable rotor. A centrifugally-actuated clutch has a first rotatable member, a second rotatable member, and at least one actuator member attached to the first rotatable member. One of the first rotatable member and the second rotatable member is operatively connected to the wheels. The other of the first rotatable member and the second rotatable member is operatively connected to the rotor. The actuator member is configured to transfer torque between the first rotatable member and the second rotatable member by an amount that decreases due to centrifugal force acting on the actuator member as a rotational speed of the first rotatable member increases. A method of control is also provided.

19 Claims, 2 Drawing Sheets

HYBRID POWERTRAIN WITH CENTRIFUGALLY-ACTUATED MOTOR DISCONNECT CLUTCH AND METHOD OF CONTROL

TECHNICAL FIELD

The present teachings generally include a hybrid vehicle with a centrifugally-actuated clutch to disconnect an electric motor.

BACKGROUND

Electric drive modules for hybrid vehicles include an electric motor that is connected to a drive axle of the vehicle through a gearing arrangement. The electric motor provides propulsion assistance in certain vehicle operating modes. A higher gear ratio of the gearing arrangement allows the motor to have a relatively low maximum torque, as the torque provided by the motor is multiplied by the gear ratio. An electric drive module may be limited in gear ratio by a number of factors, especially by the top speed of the motor. That is, at high axle speeds, the speed of the electric motor will be even greater with a high gear ratio, so the gear ratio must be kept below that which would cause the motor to exceed its maximum speed.

SUMMARY

A hybrid vehicle is provided with a centrifugally-actuated clutch to disconnect an electric motor from vehicle wheels as wheel speed increases. Specifically, a hybrid vehicle has an electric motor with a rotatable rotor. A centrifugally-actuated clutch has a first rotatable member, a second rotatable member, and at least one actuator member attached to the first rotatable member. One of the first rotatable member and the second rotatable member is operatively connected to the wheels. The other of the first rotatable member and the second rotatable member is operatively connected to the rotor. The actuator member is configured to transfer torque between the first rotatable member and the second rotatable member by an amount that decreases due to centrifugal force acting on the actuator member as a rotational speed of the first rotatable member increases.

In one embodiment, when the clutch engages as wheel speed decreases and centrifugal force therefore decreases, the motor may be controlled to prevent a torque disturbance as the clutch begins to close. A method of controlling a hybrid vehicle therefore includes monitoring a speed of rotation of a rotor of an electric motor, and varying either or both of the speed of rotation of the rotor and the torque of the rotor when the monitored speed of rotation of the rotor indicates that the centrifugally-actuated clutch is slipping, such as upon reengagement of the clutch when the wheel speed decreases.

Accordingly, because the centrifugally-actuated clutch can be configured so that the motor is disconnected from the wheels at a speed well below the vehicle top speed, the gear ratio of any gearing arrangement that may be operatively connected between the motor and the wheels is eliminated as a constraint on the electric motor. That is, the centrifugally-actuated disconnect clutch may allow a higher gear ratio and a smaller, lower torque motor to provide the same output torque and vehicle top speed as with a motor that cannot disconnect from the wheels. The motor may be used for propulsion assistance, such as for an electric all-wheel drive operating mode at low to medium speeds (e.g., 0 to 80 kilometers per hour) in a vehicle that may be driven by a primary powertrain at low to high speeds (e.g., 0 to 200 kilometers per hour). For example, motor size can be reduced by 50 percent compared to a motor unable to disconnect at high speeds and with a lower gear ratio of a gearing arrangement. Because the motor will be disconnected from the wheels at relatively high speeds, it can be slowed or stopped at high speeds, reducing spin losses. Additionally, the clutch is self-actuating by centrifugal force, eliminating the need for an actuating system, such as an electric or hydraulic actuator, and associated power requirements and spin losses.

The above features and advantages and other features and advantages of the present teachings are readily apparent from the following detailed description of the best modes for carrying out the present teachings when taken in connection with the accompanying drawings.

DETAILED DESCRIPTION

Figure 1:
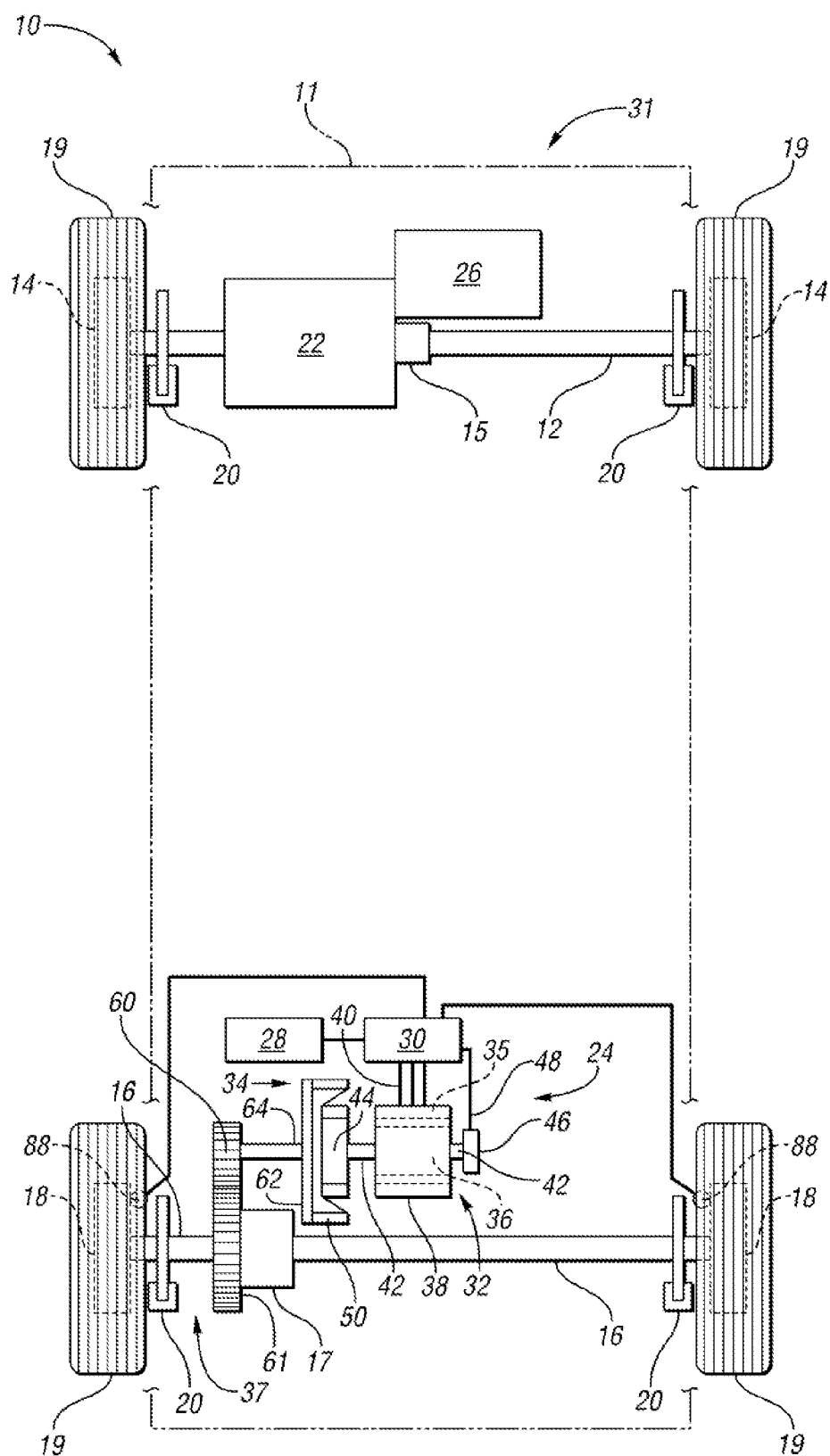
FIG. 1 is a schematic illustration of a vehicle with a powertrain that includes an electric drive module with a centrifugally-actuated clutch in accordance with one aspect of the present teachings.

Referring to the drawings, wherein like reference numbers refer to like components throughout the several views, FIG. 1 schematically depicts a hybrid electric vehicle 10 with a frame 11 (shown in phantom) having a first axle 12 connected to a first pair of wheels 14 and a second axle 16 connected to a second pair of wheels 18. In one embodiment, the wheels 14 are front wheels, and the wheels 18 are rear wheels. In FIG. 1, the wheels 14, 18 are shown attached to tires 19. Each axle 12, 16 has two separate axle portions connected via a respective differential 15, 17 as is readily understood by those skilled in the art. Each wheel 14, 18 has a friction brake mechanism 20, shown as a disc brake. The first axle 12 is connectable to a transmission 22, and the second axle 16 is connectable to an electric drive module 24. The transmission 22 can be an automatic transmission and may or may not include a motor/generator, so that the transmission 22 may or may not be a hybrid transmission. The transmission 22 is connected to an engine 26, which has an output shaft (not shown) operatively connected with an input shaft (not shown) of the transmission 22, and provides torque through the transmission 22 to the first axle 12 through the differential 15 for propulsion of the vehicle 10. The transmission 22, the engine 26, an energy storage device 28, a controller 30, and the electric drive module 24 together establish a hybrid powertrain 31 that provides various operating modes for forward propulsion of the vehicle 10.

The electric drive module 24 includes an electric motor 32 that is selectively operatively connected to the axle 16 and wheels through a centrifugally-actuated clutch 34 and a gearing arrangement 37 to provide driving torque to the wheels 18. The electric motor 32 has an annular stator 35 and a rotor 36 surrounded by the stator 35 inside of a nonrotatable motor housing 38. The stator 35 and the rotor 36 are indicated with hidden lines inside of the housing 38. The stator 35 is fixed to the housing 38 and can receive electrical current through transfer conductors 40 from energy stored in the energy storage device 28. The controller 30 controls power flow to the motor 32 based on vehicle operating conditions, as discussed herein. The controller 30 can also have an integrated power inverter to convert direct current provided from the energy storage device 28 to alternating current needed to power the stator 34, if the motor 32 utilizes alternating current, such as if it has three-phase windings. Alternatively, a separate power inverter can be operatively connected to the controller 30 and the stator 35 if a power inverter is not integrated in the controller 30.

The rotor 36 has a rotor shaft 42 connected to the rotor 36 and that rotates commonly with the rotor 36 (i.e., at the same speed as the rotor 36). As used herein, two components are configured to "rotate commonly" or are connected for "common rotation" when the two components are connected to one another to rotate at the same speed. The rotor shaft 42 connects to a drum 44 of the centrifugally-actuated clutch 34. A speed sensor 46 is mounted on the rotor shaft 42 and sends sensor signals indicative of rotational speed of the rotor 36 over a transfer conductor 48 to the controller 30. The speed sensor 46 thus enables the controller 30 to monitor the speed of rotation of the rotor 36. The speed sensor 46 can be a motor resolver or a motor encoder. Alternatively, the speed of the rotor 36 can be determined by the controller 30 using an algorithm stored in a processor of the controller based on the electrical current flowing through the controller 30, transfer conductors 40, and stator 35, and based on the associated voltage. The torque of the rotor 36 can be determined by the controller 30 using an algorithm stored in a processor of the controller, based on the amount of current flowing to the stator 35.

Figure 2:
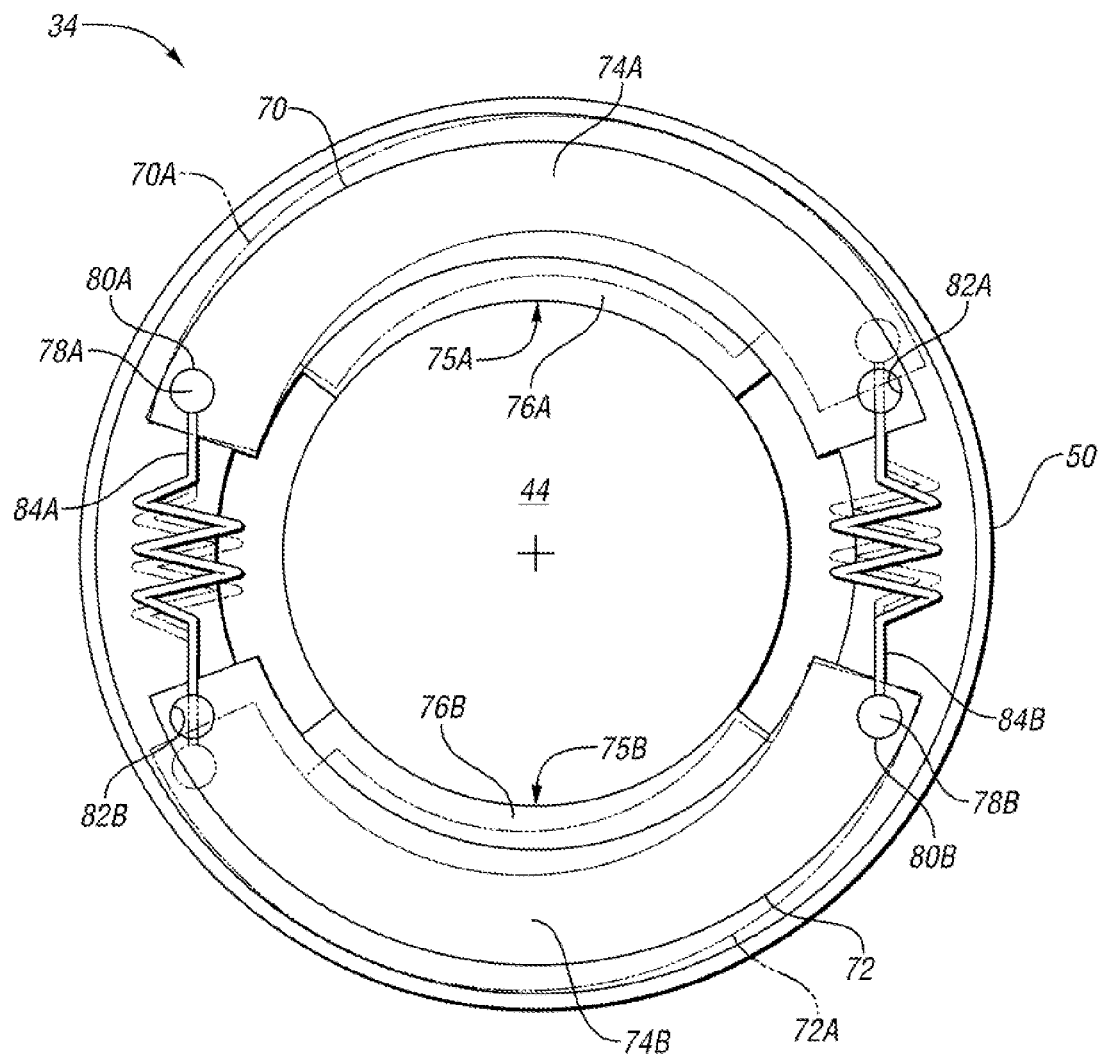
FIG. 2 is a schematic illustration in side view of the centrifugally actuated clutch of FIG. 1.

As best shown in FIG. 2, the centrifugally-actuated clutch 34 also has an annular collar 50 that radially surrounds the drum 44. As used herein, the annular collar 50 is referred to as a first rotatable member and the drum 44 is referred to as a second rotatable member. In the embodiment shown in FIG. 1, the drum 44 is connected to and rotates commonly with the rotor shaft 42 and therefore at the same speed as the rotor 36. In the embodiment shown in FIG. 1, the collar 50 rotates with a member 60 of the gearing arrangement 37. Specifically, a hub 62 extends radially inward from the collar 50 and is connected by a shaft 64 to rotate with the member 60.

As shown in FIG. 2, the centrifugally-actuated clutch 34 has a pair of actuator members 70, 72 that, in this embodiment, are weighted shoes 70, 72 and may be referred to as such. In other embodiments, the clutch 34 could have a single actuator member, or more than two actuator members. In other embodiments, the actuator members can be portions of a dog clutch that are configured to disengage the clutch due to centrifugal force as the speed of rotation of the first rotatable member increases.

Each weighted shoe 70, 72 has an outer portion 74A, 74B, respectively, and an inner portion 76A, 76B connected to and movable with the respective outer portion 74A, 74B. The outer portions 74A, 74B are attached to the collar 50 by pins 78A, 78B. Pin 78A extends through an opening 80A in outer portion 74A, near one end of the outer portion 74A, and into the collar 50 so that the shoe 70 is pivotable relative to the collar 50 with the center axis of the pin 78A serving as the pivot axis of the shoe 70. Similarly, pin 78B extends through an opening 80B in outer portion 74B, near one end of the outer portion 74B, and into the collar 50 so that the shoe 72 is pivotable relative to the collar 50 with the center axis of the pin 78B serving as the pivot axis of the shoe 72. In FIG. 2, the shoes 70, 72 are shown in a fully engaged position, in which the inner portions 76A, 76B are fully in contact with the drum 44. That is, the entire inner surfaces 75A, 75B of the inner portions 76A, 76B are in contact with the drum 44. As explained herein, the shoes 70, 72 are configured to be in the fully engaged position, shown in FIG. 2, when the speed of rotation of the collar 50 in a first direction (clockwise in FIG. 2) is not greater than a first predetermined speed of rotation.

Each shoe 70, 72 has a respective opening 82A, 82B near an end of the shoe opposite the respective pin 78A, 78B. A spring 84A has one end secured to the pin 78A of the shoe 70 and another end secured to the shoe 72 through the opening 82B. Similarly, a spring 84B has one end secured to the pin 78B of the shoe 72 and another end secured to the shoe 70 through the opening 82A. The spring 84A is configured to bias the unpinned end of the shoe 72 toward the pinned end of the opposing shoe 70. Likewise, the spring 84B is configured to bias the unpinned end of the shoe 70 toward the pinned end of the opposing shoe 72. The shoes 70, 72 are each of a sufficient weight, however, so that when the collar 50 is rotating in a first direction of rotation, which is the clockwise direction on FIG. 2, centrifugal force will cause the unpinned ends of each of the shoes 70, 72 to move radially outward, overcoming the biasing force of the springs 84A, 84B so that at a second predetermined speed of rotation of the collar 50, the shoes 70, 72 have moved to fully released positions 70A, 72A, shown in phantom. Phantom lines also show the released positions of the springs 84A, 84B. In the fully released positions 70A, 72A, there is no contact between the shoes 70, 72 and the drum 44 and, therefore, no torque transfer through the clutch 34.

The weighted shoes 70, 72 transfer torque between the collar 50 and the drum 44 when a rotational speed of the collar 50 in a first direction (clockwise in FIG. 2) is below a first predetermined speed at which centrifugal force is not great enough to move the shoes 70, 72 away from their fully engaged positions. The weighted shoes 70, 72 are configured to move so that they are completely out of contact with the drum 34 at the released positions 70A, 72A shown in phantom to prevent torque transfer between the collar 50 and the drum 44 when the rotational speed of the collar 50 in the first direction of rotation is greater than a second predetermined speed. The second predetermined speed is greater than the first predetermined speed. When the collar 50 is rotating at a speed between the first predetermined speed and the second predetermined speed, some portion of the shoes 70, 72 could be in contact with the drum 44. That is, the portions of the shoes 70, 72 closer to the pins 78A, 78B could still be in contact with the drum, even though the portions near the openings 82A, 82B may have moved radially outward from the drum 34. In this speed range, there is a potential for some torque transfer to occur across the clutch 34. That is, the clutch 34 can have some torque capacity that is less than its torque capacity when in the fully engaged state. In the case of a friction clutch, such as the one shown in the embodiment in FIG. 2, the torque capacity of the centrifugally-actuated clutch 34 decreases as the collar 50 increases in rotational speed and the centrifugal force acting on the shoes 70,72 increases to oppose the biasing force of the springs 84A, 84B.

In addition to the first member 60, which is an externally toothed gear that rotates with the collar 50, the gearing arrangement 37 of FIG. 1 also includes a second member 61, which is another externally toothed gear that meshes with the first member 60. The members 60, 61 can be referred to herein as gears. The member 61 is mounted on and configured to rotate commonly with the axle 16. Although in the embodiment shown the gearing arrangement 37 is a pair of intermeshing gears, in other embodiments the gearing arrangement 37 could instead be any other kinematic gear train, such as a planetary gearing arrangement, and may include selectively engageable clutches and brakes so that different gear ratios can be established by the gearing arrangement. In the embodiment shown, however, the gearing arrangement 37 establishes a single gear ratio from the collar 50 to the axle 16. The gear ratio is equal to the number of teeth of the second member 61 divided by the number of teeth of the first member 60. As is evident in FIG. 1, the second member 61 has a larger diameter than that of the first member 60, so that the gear ratio of the gearing arrangement 37 is greater than one. The gearing arrangement 37 thus multiplies torque and reduces speed from the rotor 36 to the axle 16.

The clutch 34 is "self-actuating" because centrifugal force alone causes it to disengage, and slowing of the speed of rotation of the collar 50 reduces centrifugal force to allow the clutch 34 to engage. Thus, hydraulic fluid is not used to engage the clutch 34 and its associated pumping losses and spin losses are not incurred. The engagement state of the clutch 34 is dependent on the speed of the collar 50, and on the relative speed of the collar 50 and the drum 44, and is independent of the speed of the rotor 36 when the speed of the collar 50 is above the second predetermined speed.

In one embodiment, the weight of the shoes 70, 72 and the stiffness of the springs 84A, 84B can be configured so that the second predetermined speed at which the shoes 70, 72 are in the fully disengaged position occurs above a vehicle speed where motor assist is not needed and the engine 26 alone will provide propulsion. The clutch 34 can thus disengage and cause a shift in operating mode from a first range of vehicle speeds at which the clutch 34 is fully engaged so the motor 32 provides propulsion force to the axle 16, and a second range of vehicle speeds higher than the speeds of the first range than the first, at which the clutch 34 is fully disengaged. Because the collar 50 is operatively connected to the wheels 18 via the axle 16, the rotational speed of the wheels 18 affects the application force of the clutch 34, but the speed of the rotor 36 has no affect on the application force of the clutch 34 after the clutch 34 has operatively separated the motor 32 from the wheels 18 by the self-actuation due to centrifugal force. The controller 30 can cease powerflow to the stator 35, or can provide powerflow to place a reverse torque on the stator 35 to cause the rotor 36 to slow down and stop while the engine 26 alone provides propulsion force at the axle 12 at speeds above the second predetermined speed.

Wheel speed sensors 88 can be operatively connected to the controller 30 and provide sensor signals to the controller 30 indicative of the rotational speed of the wheels 18 and the axle 16. The controller 30 relates the rotational speed of the axle 16 to the rotational speed of the collar 50 using the gear ratio of the gearing arrangement 37. The wheel speed sensors 88 may be anti-lock brake sensors. The wheel speed sensors 88 provide sensor signals to the controller 30 that are indicative of the speed of the axle 16 and the speed of the collar 50, and are thus indicative of the torque capacity of the clutch 34, such as whether the clutch 34 is fully engaged, fully released, or between the two states and potentially carrying some torque. One or both of the rotational speed of the rotor 36 and the rotational speed of the axle 16 can be compared to data stored in a look-up table in the controller 30 to establish three different speed regions of the vehicle 10. A first speed region can be identified in which the clutch 34 is engaged and the clutch capacity exceeds the torque capacity of the motor 32. The motor capacity would also be stored in the lookup table. Motor torque capacity typically is limited by power, which is the product of torque and speed, and therefore diminishes with speed. A synchronization region can be identified in which the motor 32 is kept spinning to prevent slip between the rotor 36 and the shoes 70, 72. Finally, a fully disengaged (i.e., fully released) region can be identified in which no torque is being transferred by the clutch 34 (i.e., the collar 50 is at a speed greater than the second predetermined speed), and the motor 32 can therefore be slowed-down to zero speed or to an equilibrium speed with the clutch 34, as discussed below.

Because the speed of the collar 50 may be different than the speed of the drum 44, when transitioning from a disengaged to an engaged state of the clutch 34, that is, when the speed of the collar 50 is slowing, there is the potential for slip of the clutch 34 between the shoes 70, 72 and the drum 44. However, the controller 30 has a stored algorithm that controls the speed of rotation of the rotor 36 and the torque applied by the rotor 36 to reduce or eliminate slip so that rotational energy is not wasted as heat or suddenly removed from the wheels 18 to accelerate the rotor 36. The slip may be calculated at least in part based on the rotational speed of the rotor 36, as indicated by the sensor signals received from the motor speed sensor 46. For example, a change in the speed of rotation of the rotor 36 may be indicative of initial contact of the shoes 70, 72 with the drum 44 or release of the shoes 70, 72 from the drum 44.

Because an operating mode in which only the engine 26 propels the vehicle 10 is desired above the second predetermined speed of the collar 50, when the controller 30 determines that the speed of the collar 50 is above the second predetermined speed, and the weighted shoes 70, 72 are therefore fully disengaged, the controller 30 can cause the speed of the rotor 36, as indicated by the motor speed sensor 46, to slow or stop. Because the rotor 36 need not spin when the speed of collar 50 is above the second predetermined speed, the ratio of the gearing arrangement 60 can be greater and the motor 32 can be of a smaller size than would otherwise be required in order to provide the same amount of torque to the axle 16.

The controller 30 can thus determine torque capacity of the centrifugally-actuated clutch 34 using the stored algorithm, based at least partially on the rotational speed of the rotor 36, the rotational speed of the axle 16, and the torque of the motor 32. The torque of the motor 32 can be determined by monitoring the current flow to the stator 35. Based on the torque capacity of the clutch 34 as so determined, the controller 30 can then provide control signals so that current provided to the rotor 36 adapts the rotational speed or the torque of the rotor 36, or both, based on the torque capacity of the centrifugally-actuated clutch 34 to reduce or avoid slip.

Thus, when the motor 32 needs to be operatively connected with the wheels 18 via the clutch 34 and the gearing arrangement 37, as the wheels 18 slow down, the rotational speed of the rotor 36, based on the sensor signals from the motor sensor 46, may be used to detect the onset of the clutch 34 closing and may react to motor motion by adding torque to the motor 32 to eliminate or reduce the output torque disturbance (e.g., synchronizing the slip of the clutch 34 to zero).

Controlling slip of the clutch 34 avoids or minimizes the energy transformed from useful work into heat in the clutch 34 during use of the motor 32 and avoids or minimizes output disturbance when the clutch 34 is transitioning from a disengaged to an engaged state. The beginning of closure of the clutch 34 and the torque capacity of the clutch 34 can only be determined based on other clutch operating characteristics, such as speed of rotation of the clutch 34, as well as the direction of rotation of the collar 50 relative to the drum 44 or application of torque between the collar 50 and the drum 44. To avoid a state where the motor 32 must be spinning to avoid drag but cannot apply significant torque, the centrifugal clutch 34 may be made self-applying with torque, which causes positive motor torque to strengthen the capacity of a frictional connection across the clutch 34.

As shown in FIG. 1, the rotor 36 is attached to the drum 44, and as shown in FIG. 2, clockwise torque from the motor 32 to the axle 16 would increase the application of the clutch 34, and counterclockwise torque from the motor 32 would reduce the capacity of the clutch 34. This results in asymmetric torque capacity at the same speed for forward propulsion and regenerative braking of the vehicle using the motor 32. Regenerative braking may commonly occur when the vehicle is slowing down and the clutch 34 is closing.

If the collar 50 with the weighted shoes 70, 72 was operatively connected to the first member 60 of the gearing arrangement 37, as in FIG. 1, and the clutch 34 was allowed to close with the rotor 36 of the motor 32 stationary, then the clutch 34 would attempt to drag the rotor 36 up to its own speed, potentially causing a torque spike or bump. To eliminate this potential for a bump upon engagement of the clutch 34, motor speed sensing, such as by the speed sensor 46, or by monitoring the current to the rotor 36, could be used to detect that the rotor 36 is being rotated by the onset of clutch drag. The controller 30 has a stored algorithm that varies current and thereby the torque applied by the rotor 36 to reduce or eliminate the slip speed of the clutch 34, the torque disturbance, and the energy of engagement.

The centrifugally-actuated clutch 34 may be arranged so that the collar 50 is attached to the rotor 36 and the drum 44 is attached to the first member 60 of the gearing arrangement 37. In this instance, the centrifugally-actuated clutch 34 can be actuated by spinning up the rotor 36 when the speed of rotation of the axle 16 drops to a speed where the clutch 34 will be active. In this case, motor torque (e.g. based on current sensing) might be used to detect clutch engagement. Similarly, whether the weighted shoes 70, 72 are connected to rotate with either the first member 60, as shown in FIG. 1, or the rotor 34 as in an alternative embodiment, the motor torque and the detection of clutch slip by monitoring the speed of rotation of the rotor 36 and the speed of rotation of the axle 16 or the wheels 18, such as via the wheel speed sensors 88, can be used to find torque capacity of the clutch 34 or disengagement. Based on the monitored information, the controller 30 can identify the three speed regions: an active region where the torque capacity of the clutch 34 exceeds the torque of the rotor 36 (which typically diminishes with speed), a synchronization region in which the controller 30 controls the speed of rotation of the rotor 36 to avoid slip but not to add torque, and a region in which the controller 30 controls current flow, such as by ceasing current flow to the motor 32 to allow the rotor 36 to spin down to a stationary (zero) rotational speed, or a speed at which the drag of the rotor 36 on the clutch 34 is equal to the drag of the clutch 34 on the rotor 36, referred to as an equilibrium speed.

A method of controlling a hybrid vehicle such as vehicle 10 thus includes monitoring a speed of rotation of a rotor 36 of an electric motor 32, and varying one of the speed of rotation of the rotor 36 and torque of the rotor 36 when the monitored speed of rotation of the rotor 36 indicates that the centrifugally-actuated clutch 34 is slipping. The monitoring of the speed of rotation of the rotor 36 can be by receiving sensor signals from the motor speed sensor 46. The method can also include monitoring the speed of rotation of the axle 16 via the wheel speed sensors 88.

The method can include determining the toque capacity of the centrifugally-actuated clutch 34 based on the speed of rotation of the rotor 36 and the speed of rotation of the axle 16, and varying the speed of rotation of the rotor 36 based on the torque capacity of the centrifugally-actuated clutch 34 to reduce slip of the clutch if the rotational speed of the axle 16 is less than a predetermined speed. That is, if the speed of rotation of the axle 16 corresponds with the speed of rotation of the collar 50 being less than the second predetermined speed, then the rotor 36 can be adjusted in speed to increase or decrease the torque capacity of the clutch 34 as is desired.

The method can also include monitoring current flow to the motor 32, and determining torque of the rotor 36 based on the monitored current flow. The controller 30 can then cease current flow to the motor 32 if the speed of rotation of the rotor 36, the speed of rotation of the axle 16, and the torque of the rotor 36 indicate that the centrifugally-actuated clutch 34 is not engaged.

Although the centrifugally-actuated clutch 34 is shown as having weighted shoes 70, 72 that pivot outward from one end, and thus can cause slip during a range of speeds when the shoes are not completely pivoted out of contact with the drum 44, in another embodiment, the clutch 34 could be a dog-type centrifugally actuated clutch in which the weighted shoes can also be referred to as dogs. The weighted shoes in such an embodiment would not pivot outward, but would move directly radially outward from the collar 50 acting against springs when a biasing force of springs is overcome such as when a predetermined rotational speed is met or exceeded. The shoes in such an embodiment are more cleanly engaged and disengaged, and do not have a range of speeds between fully-released and fully-engaged at which slip can occur.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A hybrid vehicle having wheels and comprising:
an electric motor having a rotatable rotor that has a rotor shaft;
a centrifugally-actuated clutch having a first rotatable member, a second rotatable member, and at least one centrifugally-actuated actuator member pivotably attached to the first rotatable member; wherein the first rotatable member is operatively connected to the wheels and the second rotatable member is connected to the rotor shaft to rotate at the same speed as the rotor shaft and the rotor; wherein said at least one actuator member is configured to transfer torque between the first rotatable member and the second rotatable member by an amount that decreases due to centrifugal force on said at least one actuator member as a rotational speed of the first rotatable member increases;
wherein the first rotatable member is a collar operatively connected to the wheels, the second rotatable member is a drum radially surrounded by the collar and connected to the rotor shaft, and said at least one actuator member is a weighted shoe pivotably attached to the collar.

2. The hybrid vehicle of claim 1, further comprising:
a gearing arrangement operatively connected to the wheels and having a member connected to rotate with the first rotatable member.

3. The hybrid vehicle of claim 1, further comprising:
a controller operatively connected to the electric motor and operable to determine the rotational speed of the rotor; wherein the controller is operable to vary at least one of the rotational speed and the torque of the rotor to reduce slip between said at least one actuator member and the second rotatable member.

4. The hybrid vehicle of claim 3, wherein the controller determines rotational speed of the rotor based on at least one of a motor speed sensor, current flowing to the motor, and voltage associated with the current.

5. The hybrid vehicle of claim 4, wherein the controller is operatively connected to the wheels and is operable to determine the rotational speed of the wheels; and wherein the controller is operable to vary said at least one of the rotational speed of the rotor and the torque of the rotor to reduce slip between said at least one actuator member and the second rotatable member, as indicated by both the rotational speed of the rotor and the rotational speed of the wheels.

6. The hybrid vehicle of claim 5, wherein the controller is operable to determine torque capacity of the centrifugally-actuated clutch based at least partially on the rotational speed of the rotor and the rotational speed of the wheels; and wherein the controller is configured to vary said at least one of the rotational speed of the rotor and torque of the rotor based on the torque capacity of the centrifugally-actuated clutch.

7. The hybrid vehicle of claim 5, wherein the controller is operable to determine if the centrifugally-actuated clutch is disengaged based at least partially on the rotational speed of the wheels; and wherein the controller is operable to stop current flow to the motor so that the rotor slows when the centrifugally-actuated clutch is disengaged.

8. A hybrid vehicle having an axle and wheels connected to the axle and comprising:

an electric motor having a rotatable rotor that has a rotor shaft;

a centrifugally-actuated clutch having:

a collar, a drum radially surrounded by the collar, and a weighted shoe pivotably attached to the collar; wherein the drum is connected to the rotor shaft to rotate at the same speed as the rotor shaft and the rotor; wherein the weighted shoe is configured to transfer torque between the collar and the drum when a rotational speed of the collar in a first direction is below a first predetermined speed and is configured to release from the drum due to centrifugal force to prevent torque transfer between the collar and the drum when the rotational speed of the collar in the first direction of rotation is greater than a second predetermined speed;

a gearing arrangement operatively connected to the axle and having a member operatively connected with the collar to rotate with collar; wherein the gearing arrangement has a gear ratio between the collar and the axle; and wherein the rotor shaft is operatively connected with the drum to rotate with drum, the electric motor thus being operatively disconnected from the axle when the rotational speed of the axle is greater than the second predetermined speed divided by the gear ratio.

9. The hybrid vehicle of claim 8, wherein the axle is a rear axle and further comprising:

a front axle;
an engine operatively connected to the front axle.

10. The hybrid vehicle of claim 8, further comprising:

a controller operatively connected to the electric motor and operable to determine the rotational speed of the rotor;

wherein the controller is operable to vary at least one of the rotational speed of the rotor and the torque of the rotor to reduce slip between the weighted shoe and the drum during engagement of the centrifugally-actuated clutch.

11. The hybrid vehicle of claim 10, wherein the controller determines rotational speed of the rotor based on at least one of a motor speed sensor, current flowing to the motor, and voltage associated with the current.

12. The hybrid vehicle of claim 11, wherein the controller is operatively connected to the axle and is operable to determine the rotational speed of the axle; and wherein the controller is operable to vary said at least one of the rotational speed of the rotor and the torque of the rotor to reduce slip between the weighted shoe and the drum during engagement of the centrifugally-actuated clutch; and wherein the slip is indicated by both the rotational speed of the rotor and the rotational speed of the axle.

13. The hybrid vehicle of claim 11, wherein the controller is operable to determine torque capacity of the centrifugally-actuated clutch based at least partially on the rotational speed of the rotor and the rotational speed of the axle; and wherein the controller is configured to vary said at least one of the rotational speed of the rotor and the torque of the rotor based on the torque capacity of the centrifugally-actuated clutch.

14. The hybrid vehicle of claim 12, wherein the controller is operable to determine if the centrifugally-actuated clutch is disengaged based on the rotational speed of the axle; and wherein the controller is operable to stop current flow to the motor when the centrifugally-actuated clutch is disengaged.

15. A method of controlling a hybrid vehicle having vehicle wheels and an electronic controller, the method comprising:

monitoring via the electronic controller a speed of rotation of a rotor of an electric motor; wherein the rotor has a rotor shaft and varying one of the speed of rotation of the rotor and torque of the rotor via the controller when the monitored speed of rotation of the rotor indicates that a centrifugally-actuated clutch that transfers torque from the rotor to the vehicle wheels is slipping; wherein the centrifugally-actuated clutch has a first rotatable member operatively connected to the vehicle wheels, at least one centrifugally-actuated actuator member pivotably attached to the first rotatable member and a second rotatable member radially surrounded by the first rotatable member and connected to the rotor shaft to rotate at the same speed as the rotor shaft and the rotor; and wherein the centrifugally-actuated clutch is configured to disengage due to centrifugal force as rotational speed of the vehicle wheels increases, thereby disconnecting the rotor from the vehicle wheels.

16. The method of claim 15, wherein said monitoring the speed of rotation of the rotor includes receiving via the controller sensor signals from a motor speed sensor.

17. The method of claim 15, wherein the wheels are connected to an axle that is driven by the motor when the clutch is engaged, and further comprising:

monitoring via the controller speed of rotation of the axle; and wherein said varying one of speed of rotation of the rotor and torque of the rotor to reduce slip of the clutch is based on both said monitoring of the speed of rotation of the rotor and said monitoring of the speed of rotation of the axle.

18. The method of claim 17, further comprising:

determining via the controller toque capacity of the centrifugally-actuated clutch based on the speed of rotation of the rotor and the speed of rotation of the axle; and varying via the controller the speed of rotation of the rotor based on the torque capacity of the centrifugally-actuated clutch to reduce slip of the clutch if the rotational speed of the axle is less than a predetermined speed.

19. The method of claim 18, further comprising:
monitoring via the controller at least one of current flow to the motor and associated voltage;
determining via the controller torque of the rotor based on said at least one of the monitored current flow and voltage; and
ceasing current flow to the motor if the speed of rotation of the rotor, the speed of rotation of the axle, and the torque of the rotor indicate that the centrifugally-actuated clutch is not engaged.

\* \* \* \* \*